US009348464B2

(12) United States Patent
Swamy (10) Patent No.: US 9,348,464 B2
(45) Date of Patent: May 24, 2016

(54) IMAGING SYSTEMS AND METHODS FOR USER INPUT DETECTION

(71) Applicant: Semiconductor Components Industries, LLC, Phoenix, AZ (US)

(72) Inventor: Ramkrishna Swamy, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 168 days.

(21) Appl. No.: 13/907,574

(22) Filed: May 31, 2013

(65) Prior Publication Data

US 2013/0328834 A1 Dec. 12, 2013

Related U.S. Application Data

(60) Provisional application No. 61/656,472, filed on Jun. 6, 2012.

(51) Int. Cl.
*G06F 3/042* (2006.01)
*G06F 3/041* (2006.01)
*G06F 3/0488* (2013.01)

(52) U.S. Cl.
CPC ............ *G06F 3/0425* (2013.01); *G06F 3/0416* (2013.01); *G06F 3/04883* (2013.01)

(58) Field of Classification Search
CPC ... G06F 3/0425; G06F 3/0386; G06F 3/0428; G06F 3/04883
See application file for complete search history.

(56) References Cited

U.S. PATENT DOCUMENTS

| 7,355,593 | B2 * | 4/2008 | Hill et al. ...................... 345/173 |
| 8,436,821 | B1 * | 5/2013 | Plichta et al. ................. 345/173 |
| 8,723,986 | B1 * | 5/2014 | Merrill, Jr. ............. H04N 5/232 348/207.99 |
| 2010/0007796 | A1 * | 1/2010 | Yamaji ............... H04N 5/23219 348/588 |
| 2010/0127991 | A1 * | 5/2010 | Yee ............................... 345/173 |
| 2011/0052007 | A1 * | 3/2011 | Chen et al. ..................... 382/103 |
| 2011/0074544 | A1 * | 3/2011 | D'Souza ............... G06F 3/0416 340/5.83 |
| 2012/0139835 | A1 * | 6/2012 | Morrison et al. ............. 345/157 |
| 2012/0272194 | A1 * | 10/2012 | Yang et al. ..................... 715/863 |
| 2013/0191768 | A1 * | 7/2013 | Thompson et al. ........... 715/765 |

* cited by examiner

*Primary Examiner* — Christopher E Leiby
(74) *Attorney, Agent, or Firm* — Treyz Law Group, P.C.

(57) ABSTRACT

An imaging system may be provided that includes a camera module, a transparent or translucent surface, and processing circuitry that is configured to perform character recognition operations based on images of the translucent surface that have been captured using the camera module. The camera module may include an image sensor having an array of image pixels and one or more lenses that focus light from the translucent surface onto the array of image pixels. The processing circuitry may be configured to recognize gestures from one or more users on the translucent surface. The processing circuitry may be configured to extract user input data from captured images of an object seen through the translucent surface by extracting gesture point locations from the captured images, storing coordinate data associated with the extracted gesture point locations, and comparing the stored coordinate data with template data that corresponds to a plurality of known characters.

9 Claims, 5 Drawing Sheets

IMAGING SYSTEMS AND METHODS FOR USER INPUT DETECTION

This application claims the benefit of provisional patent application No. 61/656,472, filed Jun. 6, 2012, which is hereby incorporated by reference herein in its entirety.

BACKGROUND

This relates generally to systems that gather user input and, more particularly, to systems with image sensors for gathering user input.

Electronic devices often have input-output components. For example, an electronic device may contain a touch-sensitive display for gathering user touch input data. In a typical device with a touch-based user input component, touch input data is generated in response to capacitive, resistive, or mechanical changes in the input component when the user touches the input component. However, electrical and mechanical touch input components of this type generally require circuitry that extends across the entire input surface and are typically limited to gathering touch inputs from a single user that is in direct contact with the component. As the size of touch screens using this type of circuitry increase, the yields decrease, thereby undesirably increasing the cost of manufacturing the touch screen. In some situations, it may therefore be desirable to be able to accept user touch input on a surface without providing circuitry that extends across substantially the entire surface. It may also be desirable to be able to accept user input from multiple users at the same time without adding more and more complex circuitry to the device.

It would therefore be desirable to be able to provide user touch input devices.

DETAILED DESCRIPTION

Figure 1:
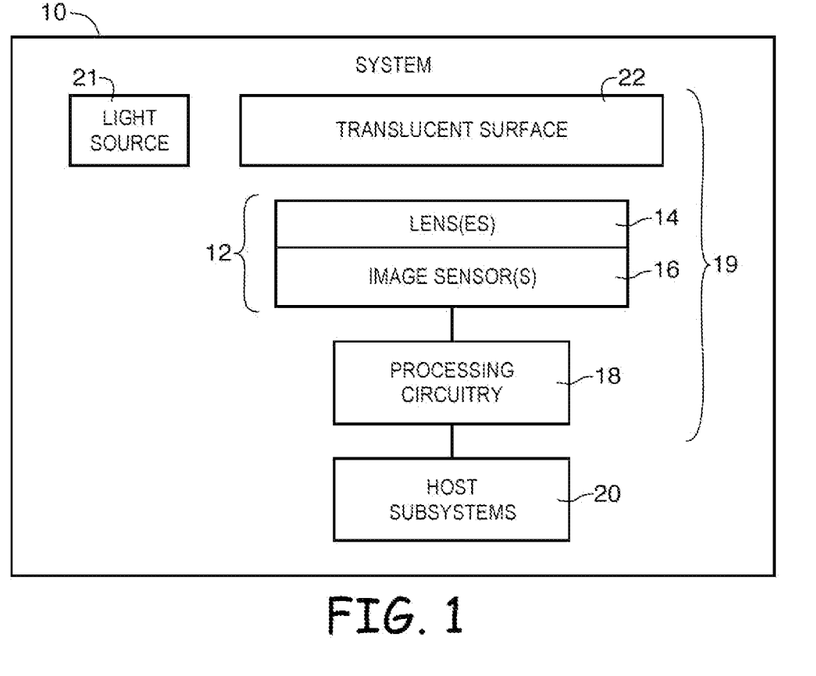
FIG. 1 is a diagram of an illustrative system of the type that may include an image sensor for accepting user touch inputs in accordance with an embodiment of the present invention.

An illustrative system in which optical user input components such as a translucent surface and a camera module having an image sensor may be used is shown in FIG. 1. As shown in FIG. 1, system 10 may include an optical user input device such as optical user input components 19.

Optical user input components 19 may include camera module 12, a transparent or translucent surface such as translucent surface 22, processing circuitry 18, and, if desired, one or more light sources such as light source 21. Optical user input components 19 may be coupled to other circuitry within system 10 such as host subsystems 20.

Camera module 12 may be used to convert incoming light into digital image data. Camera module 12 may include one or more lenses 14 and one or more corresponding image sensors 16. During image capture operations, light that has passed through translucent surface 22 may be focused onto image sensor 16 by lens 14 (e.g., a wide-angle or rectilinear lens depending on the desired focal length and format size for image sensor 16). Image sensor 16 provides corresponding digital image data to processing circuitry 18. Image sensor 16 may, for example, be a backside illumination (BSI) image sensor or a frontside illumination image (FSI) sensor having one or more arrays of image pixels and control circuitry such as row control circuitry and column readout circuitry formed on one or more semiconductor substrates. If desired, camera module 12 may be provided with an array of lenses 14 and an array of corresponding image sensors 16. Image pixels in image sensors 16 may include complementary metal-oxide-semiconductor (CMOS) image sensor pixels, charge-coupled device (CCD) image sensor pixels, or pixels based on other suitable technologies.

Image pixels in image sensors 16 may each have an associated color filter element that passes light in a given wavelength range (e.g., light of a particular color) onto that image pixel. For example, an image pixel array may include a corresponding color filter array which allows a single image sensor to sample red, green, and blue (RGB) light using corresponding red, green, and blue color filter elements arranged in a Bayer mosaic pattern. The Bayer mosaic pattern consists of a repeating unit cell of two-by-two image pixels, with two green color filters diagonally opposite one another and adjacent to a red color filter element that is diagonally opposite to a blue color filter element. However, other color filter arrangements may be used. The green color filter elements in a Bayer pattern may be replaced by clear color filter elements (sometimes referred to as an RCCB color filter array), yellow color filter elements (sometimes referred to as an RYYB color filter array), one of the green color filter elements in a Bayer-type array may be replaced by a clear color filter (sometimes referred to as a RGBC color filter array) or any other suitable arrangement of color filter elements can be used.

If desired, an image sensor may include multiple image pixel arrays that each receive light of a single color (e.g., an image pixel array that receives red light, an image pixel array that receives blue light, an image pixel array that receives green light, and an image pixel array that receives white light).

If desired, system 10 may include multiple image sensors that each receive a light of a single color (e.g., an image sensor that receives red light, an image sensor that receives blue light, an image sensor that receives green light, and an image sensor that receives white light).

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18. If desired, processing circuitry 18 may be formed on a companion chip that is coupled to an image sensor integrated circuit of image sensor 16.

Processing circuitry may be configured to perform hardware-level and/or software-level character recognition operations for simple gestures from one or more users on surface 22. This type of hardware-level recognition (e.g., using content addressable memory such as ternary content-addressable memory) may provide improved latency. Processing circuitry 18 may be used to operate the image sensor to capture images of an object such as a user-controlled object (e.g., a finger, an input member, etc.) through surface 22 and to extract user input data from the captured images of the object.

Light source 21 may, if desired, be used to illuminate surface 22. However, this is merely illustrative. If desired, surface 22 may be illuminated by ambient light. System 10 may use image sensors 16 to capture images of surface 22 while one or more users moves an object (e.g., a finger, a plastic member, etc.) along surface 22. Processing circuitry 18 may be used to detect letters and other innumerable patterns generated by the user(s) using the captured images. User input data (e.g., letters, numbers, clicks, swipes, or other gesture-related user inputs may be used to trigger an action on another subsystem such as host subsystems 20.

Host subsystems 20 may include volatile and nonvolatile memory (e.g., random-access memory, flash memory, hard drives, solid state drives, etc.). Host subsystems 20 may also include microprocessors, microcontrollers, digital signal processors, application specific integrated circuits, etc.

Image sensor 16 and/or processing circuitry 18 may include gesture recognition circuitry that recognizes user input gestures based on comparisons of image data with stored template data. For example, circuitry on a companion integrated circuit to image sensor 16 (e.g., processing circuitry 18) may detect gesture points in each of a stream of captured images, store the detected gesture points, and compare the stored gesture points to template sets of gesture points that correspond to possible input characters. Character data such in a standardized format such as ASCII character data may be output from processing circuitry 18.

Surface 22 may be formed from a thin translucent material such as glass, plastic, other polymer materials, or other suitable transparent or translucent materials. Light sources such as light source 21 light-emitting diodes or other light sources that emit light that uniformly illuminates surface 22 (e.g., from an edge of surface 22 or behind or above surface 22). Surface 22 may form some or all of a housing for system 10 within which camera module 12, circuitry 18, and subsystems 20 are mounted. However, this is merely illustrative. If desired, components such as camera module 12 may mounted separately (e.g., in another portion of a room) from surface 22.

Figure 2:
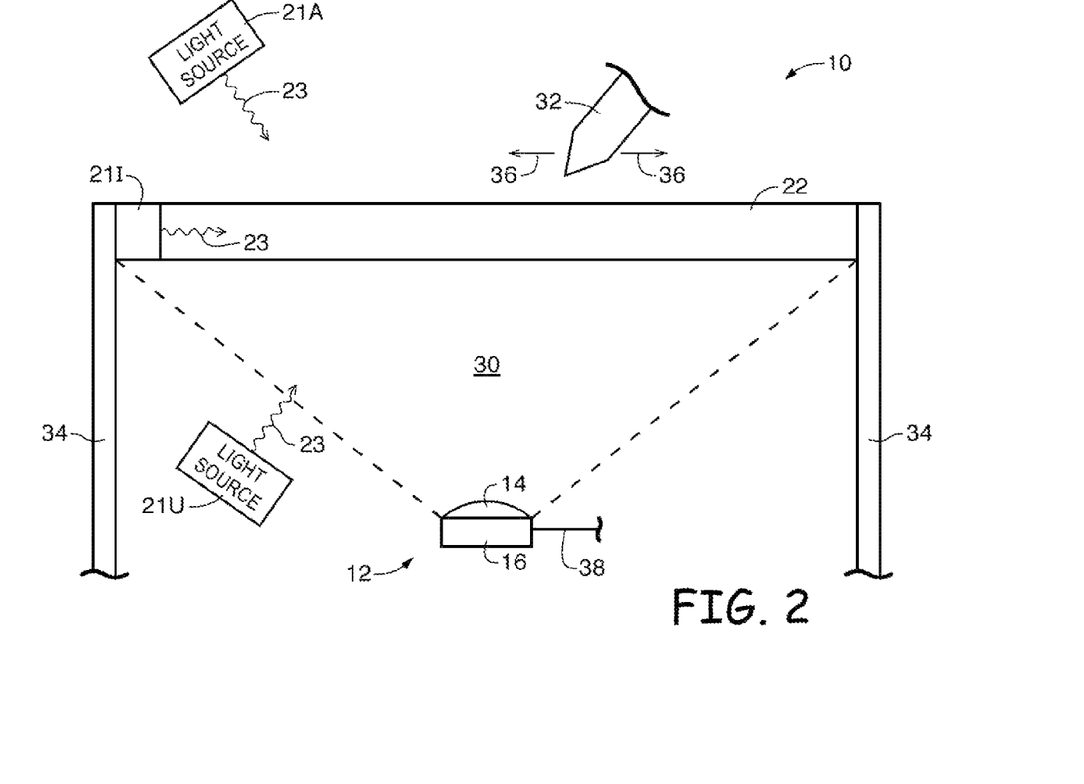
FIG. 2 is a side view of an illustrative system of the type shown in FIG. 1 that has been implemented using an image sensor and a table having a translucent surface in accordance with an embodiment of the present invention.

In one suitable configuration, system 10 may be implemented as an electronic table as shown in FIG. 2. In the example of FIG. 2, translucent surface 22 is forms a surface of a table. Image sensor 16 receives light 23 from a light source such as one or more of light sources 21U, 21A, and 21I through surface 22 that is focused onto sensor 16 using lens 14. In this type of arrangement, camera module 12 may have a field of view (FOV) 30 that include substantially all of surface 22. In this way, user gestures made by a user object such as object 32 on or over surface 22 may be visible in images captured using camera module 12. As a user moves object 32 on or above surface 22 (e.g., as indicated by arrows 36), image sensor 16 may be used to continuously capture images of object 32. Circuitry coupled to image sensor 16 (e.g., via path 38) may be used to detect user inputs such as letters, numbers, or other user input gestures based on the captured images.

Surface 22 may be mounted on mounting structures 34. Mounting structures 34 may be formed form wood, metal, plastic or other suitable materials and may form one, two, three, four, or more than four table legs for supporting surface 22. However, this is merely illustrative. If desired, structures 34 and surface 22 may completely surround camera module 12 so that camera module 12 is formed in a closed housing structure.

In this type of arrangement, system 10 may include light source 21A that projects light 23 onto surface 22 from above surface 22, light source 21U that projects light 23 onto surface 22 from underneath (below) surface 22, and/or light source 21I that is integrated into surface 22 and projects light 23 into surface 22 from an edge of surface 22. However, this is merely illustrative. If desired, surface 22 may be illuminated by ambient light in the environment of system 10 (e.g., sunlight, fluorescent or incandescent lamps in a room, or other environmental lighting).

Figure 3:
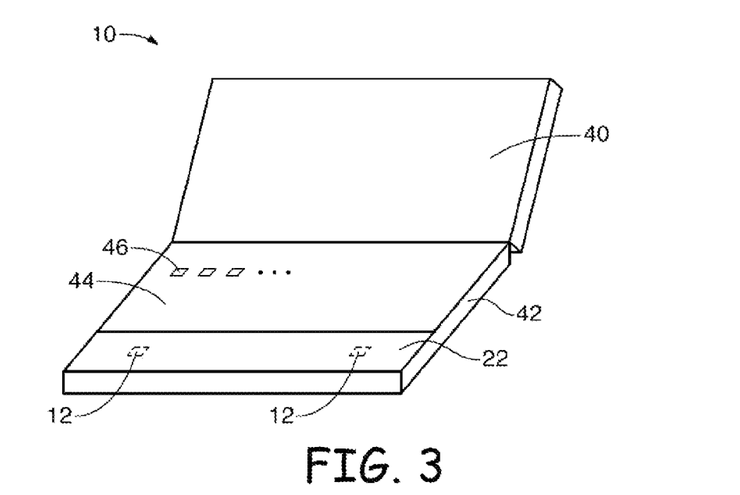
FIG. 3 is a side view of an illustrative system of the type shown in FIG. 1 that has been implemented using an image sensor and a laptop computer having a translucent surface in accordance with an embodiment of the present invention.

In another suitable configuration, system 10 may be implemented as an electronic device such as the laptop computer of FIG. 3. In the example of FIG. 3, system 10 is formed as a computer having upper portion 40 and a lower portion 42. Lower portion 42 may include a keyboard such as keyboard 44 having buttons such as keys 46. Translucent surface 22 may form a portion of an enclosure for lower portion 42. One or more imagers such as camera modules 12 containing image sensors and lenses for viewing surface 22 may be mounted within the enclosure for lower portion 42 so that the field of view of each camera module 12 includes some or all of surface 22. By capturing images of surface 22 while a user performs gestures on or over surface 22, system 10 may gather user input data through surface 22.

For example, a user may place a document on surface 22 so that camera module(s) 12 capture an image of the document. In this way, surface 22 and camera module(s) 12 may be used as a built in scanner. If desired, hardware or software may be implemented in a laptop of this type that performs automatic digitization of text on the scanned document. In another example, a user may use a finger or any other suitable object to write characters on surface 22 by hand. Camera modules 12 may be used to capture images of surface 22 while the user makes the motions of writing characters (e.g., letters, numbers, etc.) on surface 22. System 10 may include circuitry for recognizing and storing each character using the captured images.

Figure 4:
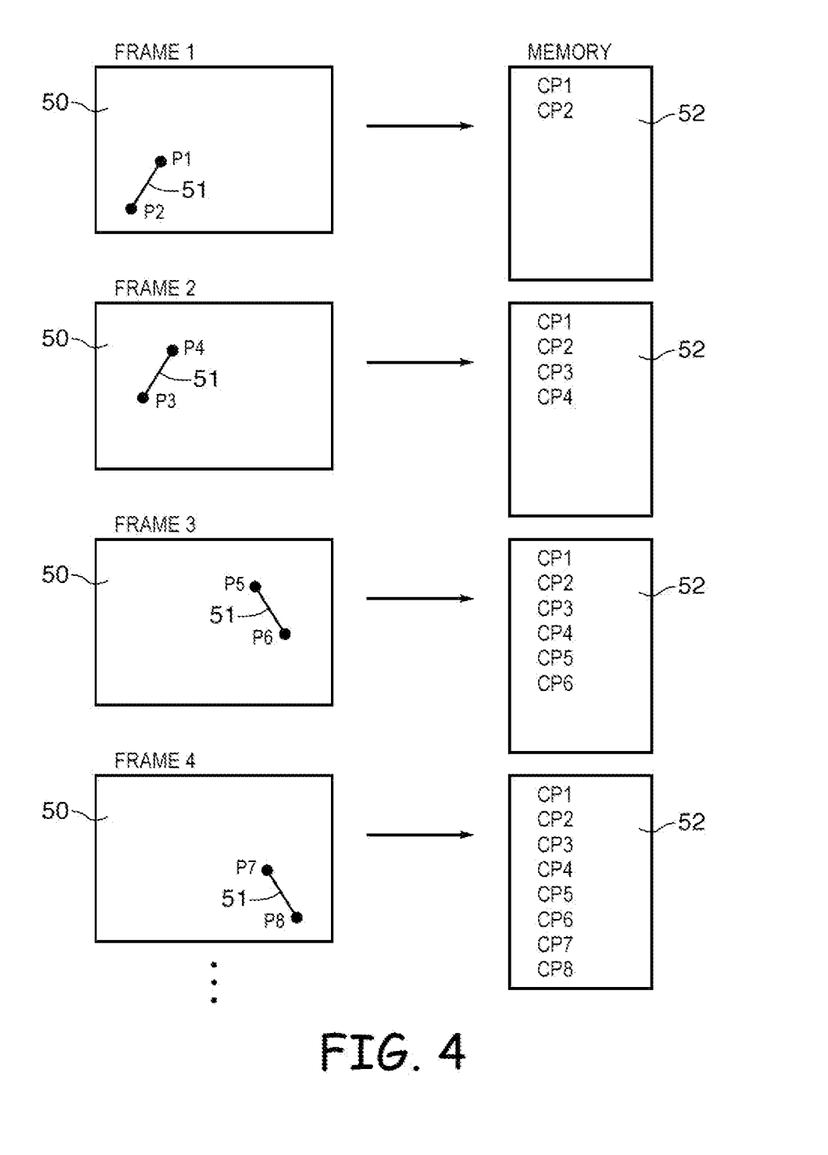
FIG. 4 is an illustrative diagram showing how images of an object moving on a translucent surface may be used to generate user input data in accordance with an embodiment of the present invention.

FIG. 4 is a diagram showing how character data may be extracted from captured images for character recognition operations. As shown in FIG. 4, camera modules such as camera modules 12 may be used to continuously capture image frames such as image frames 50. While the image frames are being captured, a user may perform gestures such as character writing gestures on a surface such as surface 22. Each image frame may capture a portion of the motion of writing an individual character. For example a first image frame (FRAME 1) may include a first motion segment 51. Circuitry such as processing circuitry 18 of FIG. 1 may be used to perform edge detection and/or other image enhancement operations on FRAME 1. The edge detection operations may be used to identify gesture point locations such as end portions P1 and P2 of segment 51. As shown in FIG. 4, storage such as memory 52 (e.g., volatile or non-volatile memory formed as a portion of image sensor 16 and/or processing circuitry 18) may be used to store coordinates CP1 and CP2 that correspond to coordinates (e.g., x-y coordinates) of gesture point locations P1 and P2.

A subsequently captured image frame (FRAME 2), may include a second motion segment 51. Circuitry such as processing circuitry 18 may be used to process FRAME 2 and identify gesture point locations such as end portions P3 and P4 of the second segment 51. Coordinates CP3 and CP4 that correspond to coordinates (e.g., x-y coordinates) of gesture point locations P3 and P4 may be added to memory 52.

Additional subsequently captured image frames (e.g., FRAME 3 and FRAME 4), may include additional motion segments 51. Circuitry such as processing circuitry 18 may be used to process FRAME 3 and FRAME 4 and identify corresponding gesture point locations such as end portions P5, P6, P7, and P8 of the additional segments 51. Coordinates CP5, CP6, CP7, and CP8 that correspond to coordinates (e.g., x-y coordinates) of gesture point locations P5, P6, P7, and P8 may be added to memory 52.

Circuitry on image sensor 16 and/or circuitry associated with processing circuitry 18 may be used to scale the distances between the coordinates stored in memory 52. In this way, user gestures that generate a relatively large or relatively small character on surface 22 can be rescaled to the size of a gesture corresponding to the size of template sets of coordinates that represent known characters. The circuitry may then compare the scaled coordinates stored with the template sets of coordinates that correspond to known characters. An input character may be generated when the coordinates stored in memory 52 match one of the template character sets. For example, the coordinates shown in FIG. 4 may be compared with a plurality of character template coordinate sets and it may be determined that the user is writing a capital letter "A". When a character is matched, the character may be stored and memory 52 may be cleared for recognition of a subsequent input character.

If an image frame is captured and no additional gesture points are found in the image, the image frame may be discarded. After a predetermined number of discarded frames the circuitry may match the currently stored gesture point coordinates with the best available match, may reset the memory without storing a character, may prompt the user to select from a list of possible characters, may be prompt the user to re-enter the character, or may prompt the user to select whether they would like to continue entering the character or discard the character.

The circuitry may be configured to reduce the number of template character template coordinate sets that are searched for subsequent letters by statistically predicting words that the user might be entering based on the already entered characters using, for example, a heuristic algorithm. For example, if a user has entered "gla", the circuitry may reduce the search templates to templates associated with "s", "d", and "r" (as examples) and exclude templates associated with "x", "w" or other letters that are unlikely to follow "gla" in an English word. The example of using English words as predictors is merely illustrative. Words or numbers in any language may be used.

Figure 5:
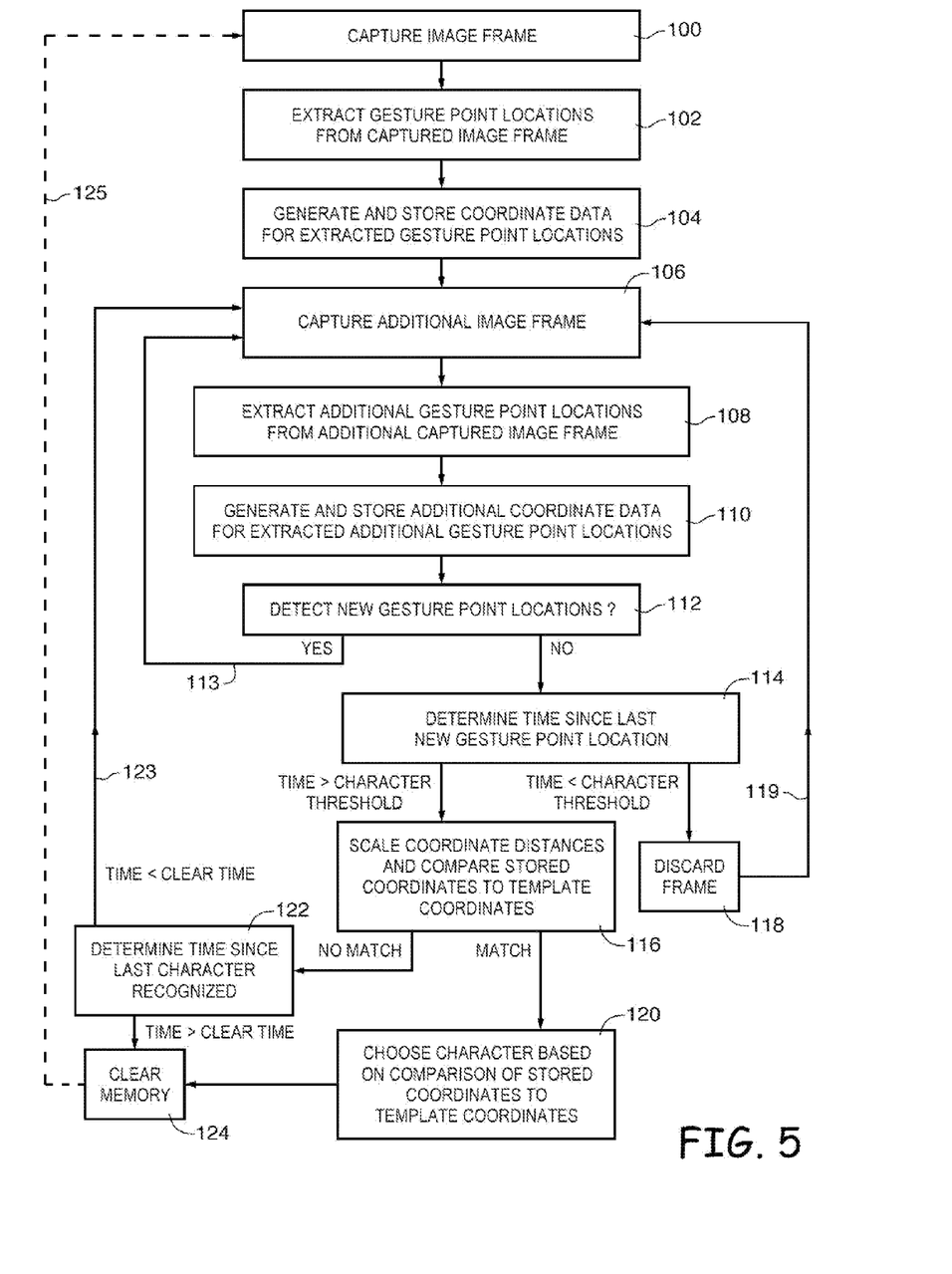
FIG. 5 is a flow chart of illustrative steps that may be used generating user input data for each of one or more identified user input regions using a system of the type shown in FIG. 1 in accordance with an embodiment of the present invention.

Illustrative steps that may be used in recognizing characters using an image sensor that captures images of a transparent (or translucent) surface on which a user makes gestures suing a system of the type shown in FIG. 1 are shown in FIG. 5.

At step 100, an image frame may be capture (e.g., using image sensor 16 and lens 14 of camera module 12). The image frame may be an image of a transparent or translucent surface such as surface 22 such as the surface of a table, a portion of a computer, etc. The image frame may include some or all of a user gesture on the surface.

At step 102, gesture point locations may be extracted from the captured image frame. The gesture point locations may be end points of a motion segment or may include more than two or less than two locations along a motion segment. Image processing operations such as edge detection operations may be performed during extraction of the gesture point locations.

At step 104, coordinate data such as gesture point coordinates associated with the extracted gesture point locations may be generated and stored.

At step 106, an additional image frame may be captured.

At step 108, additional gesture point locations may be extracted from the additional captured image frame.

At step 110, additional coordinate data such as additional gesture point coordinates associated with the additional extracted gesture point locations may be generated and stored.

At step 112, circuitry such as circuitry associated with image sensor 16, processing circuitry 18, and/or software associated with host subsystem 20 (FIG. 1) may be used to determine whether any new gesture point locations were extracted from the additional image frame.

In response to determining that new gesture point locations were extracted (e.g., if a user is still generating a given character), system 10 may return to step 106 as indicated by arrow 113.

In response to determining that no new gesture point locations were extracted (e.g., if the user has finished entering a character or has paused while entering a character), system 10 may proceed to step 114.

At step 114, system 10 may determine the time since the last new gesture point location was extracted from an image frame. The determined time may be compared to one or more thresholds such as a character threshold (e.g., a predetermined amount of time that is typical for entering a single character) and/or a clear threshold (e.g., a predetermined amount of time at which the memory is reset for entering a new character).

In response to determining that the time since the last new gesture point location was extracted from an image is less than the character threshold, system 10 may proceed to step 118.

At step 118, the current image frame may be discarded and system 10 may return to step 106 to capture a new image frame as indicated by arrow 119.

In response to determining that the time since the last new gesture point location was extracted is greater than the character threshold, system 10 may proceed to step 116.

At step 116, the stored coordinate data (coordinates) may be compared to a set of template coordinates. Each set of template coordinates may correspond to a recognizable character such as a letter, a number, a symbol, or any other recognizable characters. The template coordinate sets may be pre-loaded into memory associated with sensor 16 and/or processing circuitry 18. Comparing the stored coordinate data with the template sets of coordinate data may include rescaling and/or rotating the stored coordinate data (e.g., by increasing or decreasing distances between each coordinate by a common amount).

In response to determining that the stored coordinate data matches one of the template sets of coordinate data, system 10 may proceed to step 120.

At step 120, the character associated with that stored coordinate data may be chosen and provided to additional circuitry. After choosing a matched (recognized) character, system 10 may proceed to step 124.

In response to determining that the stored coordinate data does not match any of the template sets of coordinate data, system 10 may proceed to step 122.

At step 122, system 10 may determine the time since the last recognized (matched) character was chosen.

In response to determining that the time since the last character was recognized is less than a predetermined threshold such as a clear time, system 10 may return to step 106 (as indicated by arrow 123) and capture additional image frames.

In response to determining that the time since the last character was recognized is greater than the clear time, system 10 may proceed to step 124.

At step 124, memory that is used to store the stored coordinate data corresponding to the extracted gesture point locations may be cleared.

After clearing the member, system 10 may return to step 100 to begin character recognition operations for a new character (as indicated by arrow 125).

Figure 6:
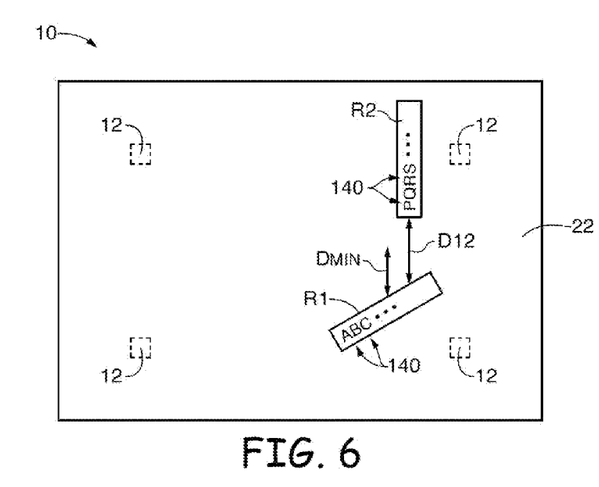
FIG. 6 is a top view of a translucent surface of a system of the type shown in FIG. 1 showing how multiple regions of a surface may be used to accept user input from multiple users at the same time in accordance with an embodiment of the present invention.

FIG. 6 is a top view of a translucent surface such as surface 22 that is visible to a camera module such as camera modules 12 of FIGS. 1, 2, and/or 3 (as examples). One, two, three, four, or more than four camera modules 12 may be used to capture images of some or all of surface 22. As shown in FIG. 6, multiple regions such as regions R1 and R2 may be used by multiple users of system 10 to enter text or other user input using surface 22 and camera modules 12. For example, a first user may use an object such as a finger, a plastic member, or any other suitable object to enter characters 140 such as "A B C" on a first region of surface 22. In response to detecting inputs "A B C" from that user, system 10 may allocate a region such as region R1 of surface 22 for input from that user. Region R1 may extend in a first direction from (e.g. to the right of) the entered characters. If desired, image sensors that view regions to the opposite side (e.g., the left) of the entered characters may be powered down based on the likelihood that additional characters will be entered in the same direction as the first characters were entered.

During another time period or during an overlapping time period another user may use an object such as a finger, a plastic member, or any other suitable object to enter additional characters 140 such as "p q r s" on another region of surface 22. In response to detecting inputs "p q r s" from that user, system 10 may allocate a second region such as region R2 of surface 22 for input from that user. Region R2 may extend in a first direction from (e.g. to the right of) the entered characters.

Regions R1 and R2 may be separated by a distance D12. System 10 may allocate any number of distinct regions that are separated by a minimum distance DMIN. In response to detecting input from an additional user on a portion of surface 22 that is less than the minimum distance DMIN from a region that is already in use, system 10 may issue a warning (e.g., a visual or audible warning) or may simply ignore input in that portion.

Figure 7:
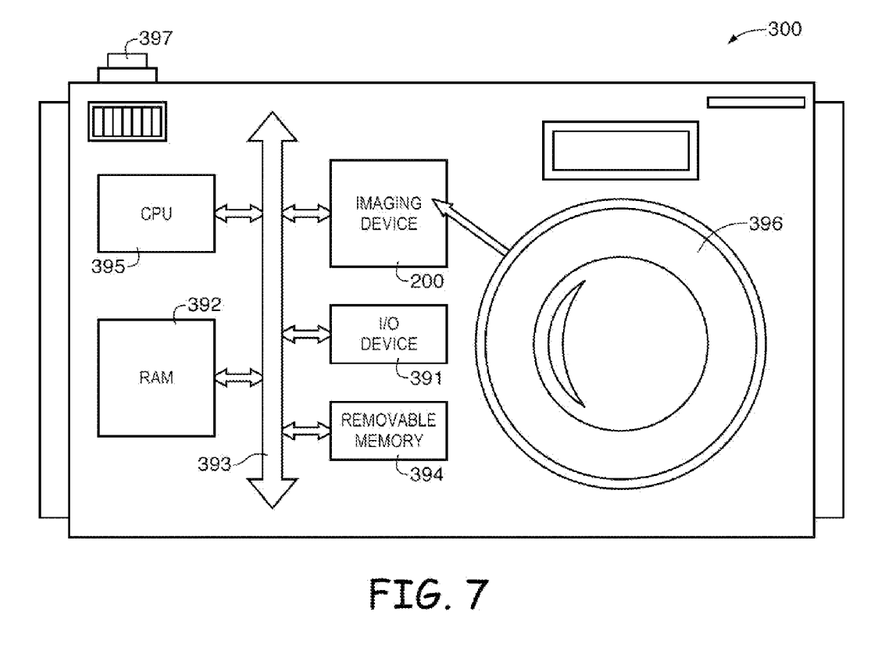
FIG. 7 is a block diagram of a processor system employing the embodiment of FIG. 1 in accordance with an embodiment of the present invention.

FIG. 7 shows, in simplified form, a typical processor system 300, such as computing equipment 10 of FIG. 1. Processor system 300 is exemplary of a system having digital circuits that could include imaging device 200 (e.g., an imaging system such as system 10 of FIG. 1). Without being limiting, such a system could include a computer system, still or video camera system, scanner, machine vision, vehicle navigation, video phone, surveillance system, auto focus system, star tracker system, motion detection system, image stabilization system, video gaming system, video overlay system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating systems and methods for hardware-level or software-level character recognition. The system may include optical user input components such as a transparent or translucent surface and a camera module having an image sensor. The camera module may have one or more lenses that project light from the translucent surface onto the image sensor. Images of the surface may include images of gestures on or near the surface by the user.

The system may include processing circuitry configured to extract gesture point locations associated with gesture segments in each captured image frame and store coordinate data associated with those gesture point locations. The system may compare stored coordinate data to sets of template coordinates that correspond to known characters such as letters, numbers or symbols. The image sensor may be formed on an image sensor integrated circuit substrate and the processing circuitry may be at least partially formed on a companion integrated circuit substrate.

The translucent surface may form a portion of a large-scale object such as a table at which multiple users can sit and enter character data or may form a portion of a smaller device such as a laptop computer or other computing device.

The foregoing is merely illustrative of the principles of this invention which can be practiced in other embodiments.

What is claimed is:
1. An imaging system, comprising:
an image sensor;
a surface that is at least partially translucent;
a lens that focuses light from the surface onto the image sensor; and
processing circuitry configured to operate the image sensor to capture images of an object through the surface and to extract user input data from the captured images of the object, wherein the processing circuitry comprises memory, and wherein the processing circuitry is configured to extract the user input data from the captured images of the object by extracting gesture point locations from the captured images, to store coordinate data associated with the extracted gesture point locations using the memory, to rotate the stored coordinate data, to scale distances between the coordinate data, and to com- pare the scaled and rotated coordinate data with template data associated with a plurality of characters.

2. The imaging system defined in claim 1 wherein the image sensor is formed on an image sensor integrated circuit and wherein the processing circuitry is at least partially formed on a companion integrated circuit.

3. The imaging system defined in claim 1 wherein the surface comprises a surface of a table.

4. The imaging system defined in claim 3, further comprising:
   at least one additional image sensor; and
   at least one additional lens that focuses additional light from the surface onto the additional image sensor.

5. The imaging system defined in claim 4 wherein the user input data comprises at least one character.

6. The imaging system defined in claim 1 wherein the surface comprises a portion of an enclosure for a laptop computer.

7. The imaging system defined in claim 6 wherein the image sensor and the lens are formed within the enclosure.

8. The imaging system defined in claim 7, further comprising:
   at least one additional image sensor in the enclosure; and
   at least one additional lens in the enclosure that focuses additional light from the surface onto the additional image sensor.

9. The imaging system defined in claim 8 wherein the user input data comprises at least one character.

* * * * *